(12) United States Patent
Kayne

(10) Patent No.: US 6,688,630 B1
(45) Date of Patent: Feb. 10, 2004

(54) BICYCLE TRAINING HANDLE

(76) Inventor: Stuart R Kayne, 240 Chesterfield Rd., Bloomfield Hills, MI (US) 48304

( * ) Notice: Subject to any disclaimer, the term of this patent is extended or adjusted under 35 U.S.C. 154(b) by 0 days.

(21) Appl. No.: 10/327,731

(22) Filed: Dec. 23, 2002

(51) Int. Cl.$^7$ ................................................ B62H 7/00
(52) U.S. Cl. ................................. 280/293; 280/288.4
(58) Field of Search ............................... 280/292, 293, 280/288.4

(56) References Cited

U.S. PATENT DOCUMENTS

| | | | |
|---|---|---|---|
| 4,903,975 A | 2/1990 | Weisbrodt et al. | 280/293 |
| 4,917,398 A | 4/1990 | de Miranda Pinto | 280/293 |
| 5,154,096 A | 10/1992 | Geller et al. | 74/551.8 |
| 5,259,638 A | 11/1993 | Krauss et al. | 280/293 |
| 5,395,130 A | 3/1995 | Rubin | 280/304 |
| 5,487,554 A | 1/1996 | May | 280/293 |
| D377,634 S | 1/1997 | DeLeo | D12/114 |
| D384,602 S | 10/1997 | Anderberg | D12/114 |
| 5,683,093 A | 11/1997 | Hayes | 280/293 |
| 5,791,675 A | 8/1998 | Fleischer | 280/293 |
| 5,988,663 A * | 11/1999 | Starks | 280/293 |

* cited by examiner

Primary Examiner—Lesley D. Morris
Assistant Examiner—L. Lum
(74) Attorney, Agent, or Firm—Reising, Ethington, Barnes, Kisselle, P.C.

(57) ABSTRACT

A training handle for attaching to a bicycle to allow a person to stabilize the bicycle while a new rider is learning to balance. The training handle is adapted to engage the bicycle where the rear wheel engages the rear fork. The training handle includes: at least one engaging portion defining a hole for receiving the axle of the rear wheel; an elongated handle portion extending generally upwardly away from each engaging portion; and a first stabilizer extending inwardly from each engaging portion from a location adjacent the hole for engaging the rear fork and preventing movement of the training handle.

20 Claims, 2 Drawing Sheets

BICYCLE TRAINING HANDLE

TECHNICAL FIELD

The invention relates generally to bicycles, and specifically to devices for training people to ride bicycles without the need for training wheels.

BACKGROUND OF THE INVENTION

People training to ride a bicycle commonly need some sort of assistance from a trainer to prevent them from falling and injuring themselves when they are in the process of learning how to balance. While the trainers may bend and grip the bike or even the trainee to stabilize the trainee, this practice has several potential drawbacks, including a sore back or back injury for the trainer, and the possibility of destabilizing or startling the trainee. Moreover, if the trainer develops a sore back, it may impair his or her ability to react quickly to the needs of the trainee. Skilled artisans in the bicycle art have devised a variety of handle-type devices that provide the trainer with a means for stabilizing the bicycle without necessarily bending or contacting the trainee.

For example, U.S. Pat. No. 5,791,675 to Fleischer and U.S. Pat. No. 4,917,938 to de Miranda Pinto show handles for attachment to a bicycle for training a new rider. But in each case the handle may pivot with respect to the bicycle. Both patents show structure for limiting the pivoting movement, but the structure and its installation are unduly complex. Also, in both cases the handle is not designed to permit the trainee rider to swing a leg over the seat to mount the bicycle—because the handle extends up from the rear axle of the bicycle too close to the

SUMMARY OF THE INVENTION AND ADVANTAGES

A new and useful training handle for a bicycle is adapted to engage the bicycle where the rear wheel engages the rear fork. The training handle includes: at least one engaging portion defining a hole for receiving the axle of the rear wheel; an elongated handle portion extending generally upwardly away from each engaging portion; and a first stabilizer extending inwardly from each engaging portion from a location adjacent the hole for engaging the rear fork and preventing movement of the training handle.

This arrangement provides a simple and reliable bike accessory that is easy to install and use in connection with two-wheel training. In many cases, the training handle can be secured to the bike with hardware that is already on the bike—as in the case of a bike having a training wheel kit that includes nuts and perhaps washers. Moreover, the new and useful training handle does not interfere with the trainee rider when the rider mounts and rides the bike. This allows users to keep the training handle on the bike well after the trainee learns how to balance, which provides additional benefits. For example: the trainer can use the handle to help the trainee start and stop; the trainer can use the handle to help push the trainee up a hill, or to slow a trainee going down a hill; and anyone can use the handle to lift the bike off the ground—in common cases where the bike does not have a kickstand.

FIGURES IN THE DRAWINGS

The present invention will now be described, by way of example, with reference to the accompanying drawings, in which.

DESCRIPTION OF THE PREFERRED EMBODIMENT

Figure 1:
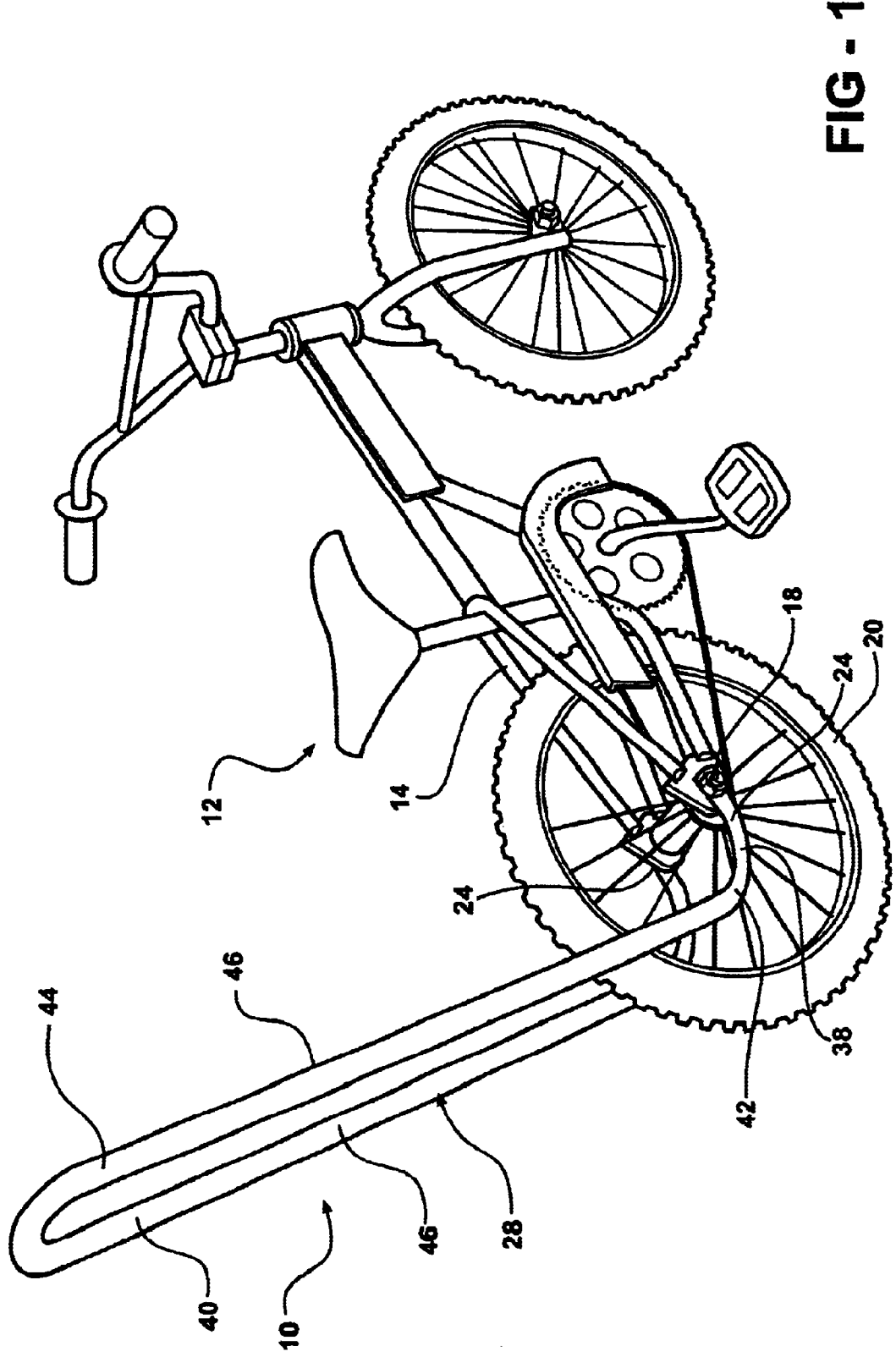
FIG. 1 is a perspective view of an embodiment of the invention shown attached to a bicycle.

The present invention will now be described, by way of example, with reference to the accompanying drawings in which the bicycle training handle is generally shown at 10. The invention is shown for use on a typical bicycle generally shown at 12 having a frame 14 with a rear fork 16 that receives the axle 18 of a rear wheel 20. The wheel is secured to the frame with conventional nuts 22.

There are multiple possible conceptions for the invention. According to the broadest conception, the training handle 10 includes: at least one engaging portion 24 defining a hole 26 for receiving the axle 18 of the rear wheel 20; an elongated handle portion generally indicated at 28 extending generally upwardly away from each engaging portion; and a first stabilizer generally indicated at 30 extending inwardly from each engaging portion from a location adjacent the hole for engaging the rear fork 16 and preventing movement of the training handle. In the embodiment shown in the Figures, there are two engaging portions 24, one for each side of the rear wheel 20. However, there may be only one engaging portion 24, and the training handle 10 could still function, depending on the material used.

Each engaging portion 24 includes a second stabilizer 32 located adjacent the hole 26 on the opposite side of the hole from the first stabilizer 30. The second stabilizer 32 also extends inwardly for engaging the rear fork 16. The second stabilizer 32 may be any kind of projection that can extend into the rear fork 16 to further stabilize the training handle 10 and lighten the load on the first stabilizer 30. In the embodiment shown in FIG. 2, the second stabilizer 32 is a fastener that is screwed or welded into place. The second stabilizer 32 may extend through the engaging portion 24 as shown, or it may project from one side of the engaging portion. Other similar structures will be apparent to persons of skill in the art in view of this teaching. For example, the second stabilizer 32 may resemble the first stabilizer.

Figure 2:
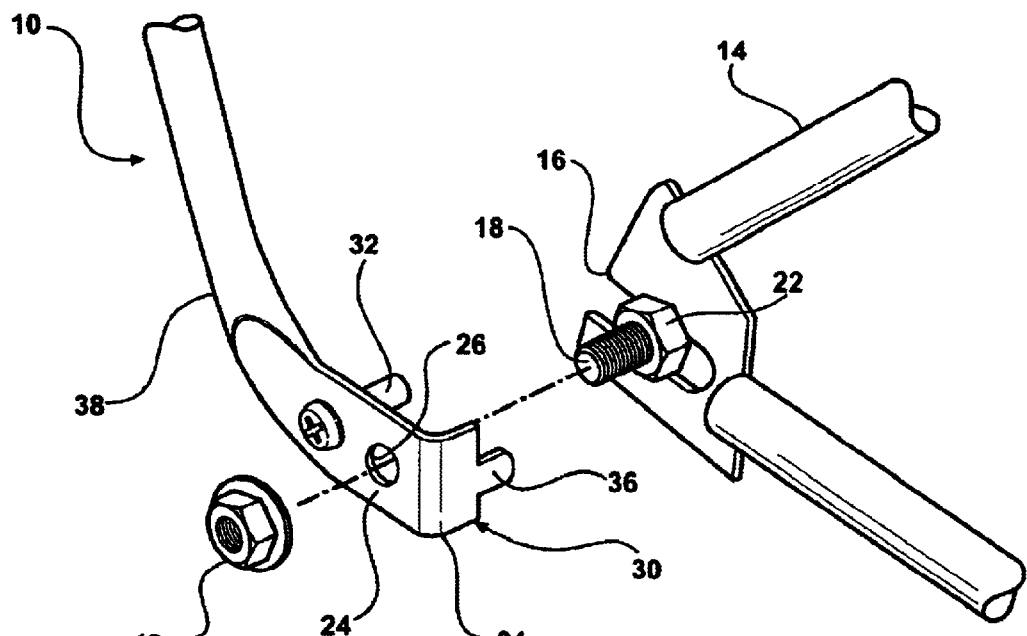
FIG. 2 is an exploded perspective view showing the manner in which the embodiment of FIG. 1 attaches to a bicycle.
Figure 3:
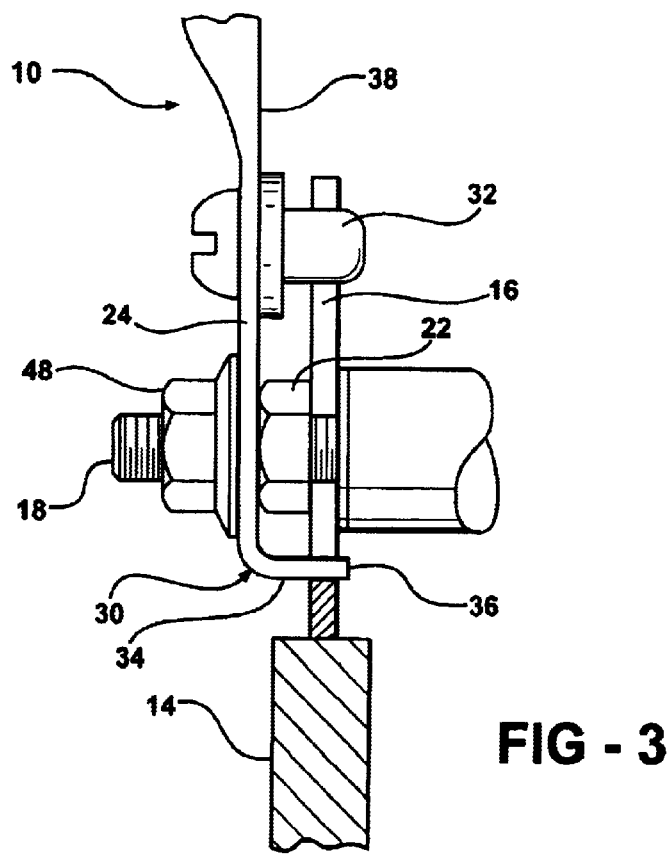
FIG. 3 is top sectional view showing the manner in which the embodiment of FIG. 1 engages the frame of a bicycle.

As shown in FIGS. 2 and 3, the first stabilizer 30 includes a spacer 34 extending from the engaging portion 24 and adapted to engage the side of the fork 16 in the manner shown. The first stabilizer 30 also includes a finger 36 extending from the spacer 34 and adapted to extend into the fork 16. The spacer 34 has a predetermined length to space the engaging portion 24 away from the bicycle frame 14 to provide clearance for a wheel nut 22. The spacer 34 has shoulders that prevent it from extending into the fork 16. When the training handle 10 is assembled onto the bike, the finger 36, which is narrower than the spacer 34, extends into the fork 16 near the rear axle 18 of the bike 12. The second stabilizer 32 is sized so that it may extend into the fork 16 on the other side of the rear axle 18.

In the preferred embodiment, the handle portion 28 further includes an intermediate portion 38 disposed adjacent the engaging portion 24, and also a gripping portion 40. The intermediate portion 38 extends generally horizontally away from each engaging portion 24 so that the gripping portion 40 extends behind the rear wheel 20. This feature spaces the gripping portion 40 back from the seat so that the rider can swing a leg over the seat to straddle the bike. If the handle portion 28 is too close to the seat, it will impair the rider as the rider tries to straddle the bike.

The training handle 10 further includes a curved portion 42 between each intermediate portion 38 and each gripping portion 40. The gripping portion 40 is also curved as shown in the figures.

Preferably, the training handle 10 is made from a tubular metal material that is formed as shown in the figures to create the various curves, the flattened portion on the engaging portion 24, the spacer 34, and the finger 36. However, various different materials are possible, as will be appreciated by people of ordinary skill in the art. Moreover, the training handle 10 may be made from several different pieces that may be made from different materials.

There is a different conception of the invention involving some different terminology. According to that conception, the training handle 10 includes a top portion 44, and first and second legs 46 each extending vertically away from the top portion. The legs 46 extend parallel to one another each toward a foot end. The training handle 10 also includes first and second feet 38, each extending horizontally away from a foot end of the legs 46 toward a connecting end 24. In other words, the first foot extends away from the foot end of the first leg, and the second foot extends away from the foot end of the second leg. The connecting ends 24 of each foot define a hole 26 for receiving the axle 18 of the rear wheel 20. Each connecting end 24 also includes a first stabilizer generally indicated at 30 extending inwardly from a location adjacent its hole 26 for engaging the rear fork 16.

In any case, the training handle 10 can be secured to the bicycle 12 in the manner shown in the figures. The axle 18 of the rear wheel 20 extends through holes 26; and the first and second stabilizers 30, 32 extend into the fork on either side of the axle 18. Nuts 48 thread onto the axle 18 and secure the training handle in place. These nuts 48 may be nuts from a training wheel kit or elsewhere. The nuts 48 or similar suitable hardware (possibly including washers) may also be supplied in a kit with the training handle 10.

The preferred embodiments of the invention have been disclosed in detail as required by the Patent Statute; and they have been disclosed in such a way as to suggest other embodiments that do not depart from the essence of the invention. With this disclosure, people of ordinary skill in the art in particular will appreciate a variety of ways in which the invention may be practiced.

The true scope of the invention is set forth in the following claims and not in the foregoing Description of the Preferred Embodiments. The terms of the claims mean what they say and have the ordinary meaning that would be attributed to them by persons skilled in the art—absent a clear effort in this patent to give the claim terms a meaning other than their ordinary meaning. The claims are intended to be broader in scope than the Description of the Preferred Embodiments; and indeed they are intended to be as broad as permitted by law.

I claim:

1. A training handle for a bicycle adapted to engage the bicycle where the rear wheel engages the rear fork, the training handle comprising:
   at least one engaging portion defining a hole for receiving the axle of the rear wheel;
   an intermediate portion extending generally horizontally away from each engaging portion;
   an elongated gripping portion extending generally upwardly away from each intermediate portion; and
   a first stabilizer extending inwardly from each engaging portion from a location adjacent the hole for engaging the rear fork and preventing movement of the training handle.

2. The training handle of claim 1 including a second stabilizer extending inwardly from each engaging portion for engaging the rear fork.

3. The training handle of claim 1 wherein the first stabilizer includes a spacer extending from the engaging portion and adapted to engage the fork, and a finger extending from the spacer and adapted to extend into the fork.

4. The training handle of claim 3 wherein the spacer has a predetermined length to space the engaging portion away from the bicycle frame to provide clearance for a wheel nut.

5. The training handle of claim 1 wherein the gripping portion extends behind the rear wheel.

6. The training handle of claim 1 wherein the training handle is made from a tubular material.

7. The training handle of claim 1 further including a curved portion between each intermediate portion and each gripping portion.

8. The training handle of claim 1 wherein the gripping portion is curved.

9. A training apparatus for a bicycle adapted to engage the bicycle where the rear wheel engages the rear fork, the training apparatus comprising:
   a top portion;
   first and second legs each extending vertically away from the top portion in substantially parallel fashion toward a foot end;
   first and second feet each extending horizontally away from the foot end of the legs toward a connecting end, the connecting ends each defining a hole for receiving the axle of the rear wheel; and
   a first stabilizer extending inwardly from at least one of the connecting ends adjacent its hole for engaging the rear fork.

10. The training handle of claim 9 wherein each connecting end includes a second stabilizer extending inwardly for engaging the rear fork.

11. The training handle of claim 9 wherein the first stabilizer includes a spacer extending from the connecting end and adapted to engage the fork, and a finger extending from the spacer and adapted to extend into the fork.

12. The training handle of claim 9 wherein the top portion is substantially horizontal.

13. The training handle of claim 9 wherein the top portion extends beyond the rear wheel.

14. The training handle of claim 9 wherein the handle is made from a tubular material.

15. The training handle of claim 9 further including a curved portion between each of the first and second feet and each of the first and second legs.

16. The training handle of claim 9 wherein the top portion is curved.

17. A training handle for a bicycle adapted to engage the bicycle where the rear wheel engages the rear fork, the training handle comprising:
   at least one engaging portion defining a hole for receiving the axle of the rear wheel;
   an elongated handle portion extending generally upwardly away from each engaging portion; and
   a first stabilizer extending inwardly from each engaging portion from a location adjacent the hole for engaging the rear fork and preventing movement of the training handle.

18. The training handle of claim 17 wherein each engaging portion includes a second stabilizer extending inwardly for engaging the rear fork.

19. The training handle of claim 17 wherein the first stabilizer includes a spacer extending from the connecting end and adapted to engage the fork, and a finger extending from the spacer and adapted to extend into the fork.

20. The training handle of claim 17 wherein each handle portion includes an intermediate portion disposed adjacent the engaging portion, and also a gripping portion disposed adjacent the intermediate portion, the intermediate portion extending generally horizontally away from the engaging portion so that the gripping portion extends behind the rear wheel.

* * * * *